United States Patent
Hosokawa et al.

(10) Patent No.: US 8,077,253 B2
(45) Date of Patent: Dec. 13, 2011

(54) SOLID-STATE DEVICE HAVING DIGITAL SIGNAL PROCESSING CIRCUIT

(75) Inventors: Junichi Hosokawa, Yokohama (JP); Yuuki Koguchi, Yokohama (JP); Keizo Tashiro, Yokohama (JP); Teppei Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 334 days.

(21) Appl. No.: 12/485,381

(22) Filed: Jun. 16, 2009

(65) Prior Publication Data

US 2009/0310000 A1 Dec. 17, 2009

(30) Foreign Application Priority Data

Jun. 17, 2008 (JP) ................................ 2008-158156

(51) Int. Cl.
*H04N 5/232* (2006.01)
*H04N 5/217* (2011.01)
(52) U.S. Cl. .................... 348/354; 348/355; 348/241
(58) Field of Classification Search .......... 348/241–251, 348/354, 355
See application file for complete search history.

(56) References Cited

U.S. PATENT DOCUMENTS

| | | | | |
|---|---|---|---|---|
| 4,591,900 A * | 5/1986 | Heeb et al. | ..................... | 348/277 |
| 4,774,569 A * | 9/1988 | Morton et al. | ................. | 348/107 |
| 4,833,722 A * | 5/1989 | Morton et al. | ................. | 382/199 |
| 4,853,795 A * | 8/1989 | Morton et al. | ................. | 358/447 |
| 4,855,943 A * | 8/1989 | Lewis | ........................... | 702/189 |
| 4,868,670 A * | 9/1989 | Morton et al. | ................. | 358/447 |
| 4,903,141 A * | 2/1990 | Morton et al. | ................. | 358/3.23 |
| 4,965,679 A * | 10/1990 | Morton et al. | ................. | 358/3.23 |
| 4,982,294 A * | 1/1991 | Morton et al. | ................. | 358/465 |
| 7,889,272 B2 * | 2/2011 | Nishide | ........................ | 348/354 |
| 2004/0105016 A1 * | 6/2004 | Sasaki | ....................... | 348/222.1 |
| 2005/0270395 A1 * | 12/2005 | Yoneda et al. | ................ | 348/308 |
| 2006/0103892 A1 * | 5/2006 | Schulze et al. | ................ | 358/463 |
| 2006/0182364 A1 * | 8/2006 | John | .............................. | 382/260 |
| 2007/0195178 A1 * | 8/2007 | Ooishi | ........................ | 348/241 |
| 2008/0174671 A1 * | 7/2008 | Tanaka et al. | ............... | 348/222.1 |
| 2008/0218782 A1 * | 9/2008 | Seki et al. | ..................... | 358/1.9 |
| 2008/0252789 A1 * | 10/2008 | Sawa | ............................ | 348/607 |
| 2008/0291312 A1 * | 11/2008 | Egawa | ........................ | 348/308 |
| 2008/0303919 A1 * | 12/2008 | Egawa | ........................ | 348/223.1 |
| 2009/0263017 A1 * | 10/2009 | Tanbakuchi | ................. | 382/167 |
| 2010/0033596 A1 * | 2/2010 | Kanemitsu et al. | ........ | 348/229.1 |

FOREIGN PATENT DOCUMENTS

| | | |
|---|---|---|
| JP | 3-153193 | 7/1991 |
| JP | 2003-346143 | 12/2003 |
| JP | 2007-335991 | 12/2007 |
| JP | 2008-17037 | 1/2008 |

OTHER PUBLICATIONS

U.S. Appl. No. 12/554,409, filed Sep. 4, 2009, Kanemitsu et al.
U.S. Appl. No. 12/823,646, filed Jun. 25, 2010, Sato, et al.

* cited by examiner

*Primary Examiner* — Sinh Tran
*Assistant Examiner* — Selam Gebriel
(74) *Attorney, Agent, or Firm* — Oblon, Spivak, McClelland, Maier & Neustadt, L.L.P.

(57) ABSTRACT

An analog signal photo-electrically converted in a pixel of a light receiving area is converted to a digital signal by an ADC. The digital signal is processed by a digital signal processing circuit, and then, successively output as a digital video signal. The digital signal processing circuit has a first signal processing block for detecting and correcting a pixel defect and preventing a noise, and a second signal processing block for restoring apparent resolution lost by the processing by the first signal processing block.

16 Claims, 7 Drawing Sheets

| | | | | |
|---|---|---|---|---|
| 4H | R | Gr | R | Gr | R |
| 3H | Gb | B | Gb | B | Gb |
| 2H | R | Gr | R | Gr | R |
| 1H | Gb | B | Gb | B | Gb |
| 0H | R | Gr | R | Gr | R |

FIG. 2B

| | -1 | | -1 | |
|---|---|---|---|---|
| -1 | | +2 | | -1 |
| | +2 | | +2 | |
| -1 | | +2 | | -1 |
| | -1 | | -1 | |

FIG. 5A

| R | Gr | R | Gr | R |
|---|---|---|---|---|
| Gb | B | Gb | B | Gb |
| R | Gr | R | Gr | R |
| Gb | B | Gb | B | Gb |
| R | Gr | R | Gr | R |

FIG. 5B

| 809 | 855 | 810 | 856 | 811 |
|---|---|---|---|---|
| 857 | | 851 | | 858 |
| 812 | 852 | 813 | 853 | 814 |
| 859 | | 854 | | 860 |
| 815 | 861 | 816 | 862 | 817 |

| 1055 | 1068 | 1056 | 1069 | 1057 |
|------|------|------|------|------|
| 1070 |      | 1064 |      | 1071 |
| 1058 | 1065 | 1059 | 1066 | 1060 |
| 1072 |      | 1067 |      | 1073 |
| 1061 | 1074 | 1062 | 1075 | 1063 |

(12) United States Patent
US 8,077,253 B2

SOLID-STATE DEVICE HAVING DIGITAL SIGNAL PROCESSING CIRCUIT

CROSS-REFERENCE TO RELATED APPLICATIONS

This application is based upon and claims the benefit of priority from prior Japanese Patent Application No. 2008-158156, filed Jun. 17, 2008, the entire contents of which are incorporated herein by reference.

BACKGROUND OF THE INVENTION

1. Field of the Invention

The present invention relates to a solid-state imaging device. In particular, the present invention relates to a logic circuit, which is embedded to configure an apparent-resolution restoration system, and for example, used for a solid-state device such as a CMOS sensor outputting a digital video signal.

2. Description of the Related Art

A conventional solid-state imaging device is embedded with a logic circuit, which simultaneously performs pixel defect correction and noise prevention. In the logic circuit, a pixel defect of the center pixel is detected and corrected using 3×3=9 same color pixel digital signals included in a 5×5=25 pixel area, and simultaneously, noise prevention of the center pixel is performed. However, the foregoing operation for performing pixel correction and noise prevention consequently needs an arithmetic processing of making narrow a digital video signal band. As a result, it is difficult to avoid a reduction of resolution.

Moreover, another conventional solid-state imaging device is embedded with a logic circuit, which performs noise prevention of the center pixel. In the logic circuit, noise prevention of the center pixel is performed using 3×3=9 same color pixel digital signals included in a 5×5=25 pixel area. However, the foregoing operation of performing noise prevention consequently needs an arithmetic processing of making narrow a digital video signal band. As a result, it is difficult to avoid a reduction of resolution.

Jpn. Pat. Appln. KOKAI Publication No. 2007-335991 discloses a solid-state imaging device, which is mounted with a logic circuit for performing pixel defect correction and noise prevention.

BRIEF SUMMARY OF THE INVENTION

According to a first aspect of the present invention, there is provided a solid-state imaging device comprising:

a light receiving area configured to include a plurality of different-color pixels each performing photoelectric conversion;

an analog-to-digital conversion circuit configured to convert a photo-electrically converted analog signal in each pixel of the light receiving area to a digital signal; and a digital signal processing circuit configured to receive the digital signal output from the analog-to-digital conversion circuit, and configured to perform a digital processing with respect to the received digital signal, and configured to output a digital-processed signal, the digital signal processing circuit including:

a first signal processing block configured to perform a first processing for preventing a noise component included in a digital signal of a pixel positioning on the center of several pixels included in a desired area of the light receiving area; and a second signal processing block configured to perform a second processing for extracting a high-frequency component existing in a digital signal of a pixel positioning on the center of several pixels included in a desired area of the light receiving area to restore apparent resolution.

According to a second aspect of the present invention, there is provided a solid-state imaging device comprising:

a light receiving area configured to include a plurality of different-color pixels each performing photoelectric conversion;

an analog-to-digital conversion circuit configured to convert a photo-electrically converted analog signal in each pixel of the light receiving area to a digital signal; and a digital signal processing circuit configured to receive the digital signal output from the analog-to-digital conversion circuit, and configured to perform a digital processing with respect to the received digital signal, and configured to output a digital-processed signal, the digital signal processing circuit including:

a first signal processing block configured to perform a first processing for detecting and correcting a signal defect of a pixel positioning on the center of several pixels included in a desired area of the light receiving area, and configured to perform a second processing for preventing a noise component of a digital signal of the pixel positioning on the center; and a second signal processing block configured to perform a third processing for receiving an output from the first signal processing block, and configured to extract a high-frequency component existing in a digital signal of a pixel positioning on the center of a plurality of pixels included in the desired area of the light receiving area.

DETAILED DESCRIPTION OF THE INVENTION

Various embodiments of the present invention will be hereinafter described with reference to the accompanying drawings.

First Embodiment

Figure 1:
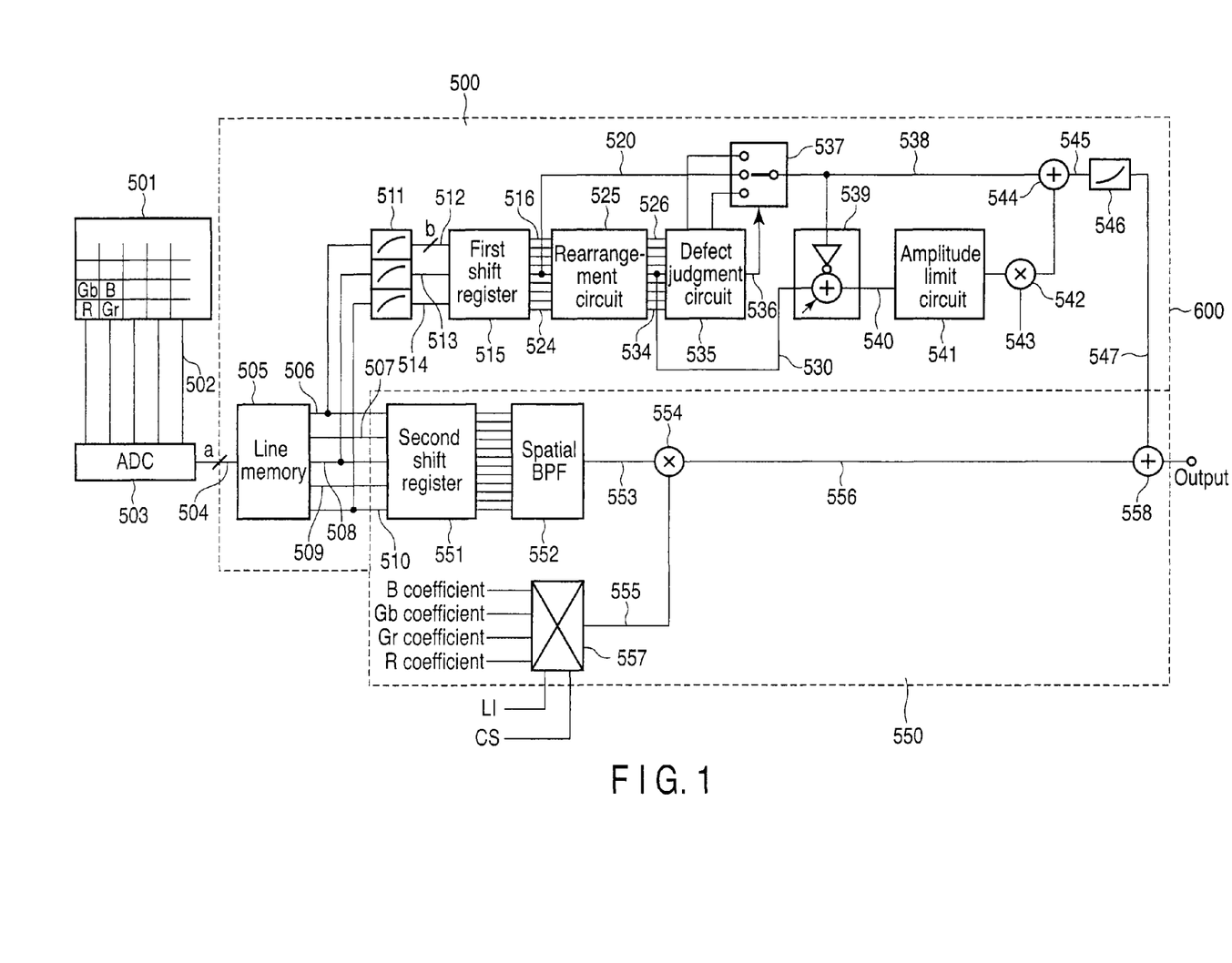
FIG. 1 is a block diagram showing the configuration of a CMOS image sensor according to a first embodiment of the present invention.

FIG. 1 is a block diagram showing the configuration of a CMOS image sensor according to a first embodiment of the present invention. The CMOS image sensor has a digital signal processing circuit 600. The digital signal processing circuit 600 is configured to combine a pixel defect correction/noise prevention circuit (first signal processing block) 500 with an apparent-resolution restoration circuit (second signal processing block) 550. The pixel defect correction/noise prevention circuit 500 performs pixel defect correction and noise prevention.

In FIG. 1, 501 denotes a several-color m×n pixel (m and n are optionally integer numbers) light receiving area for performing photoelectric conversion. The light receiving area 501 performs photoelectric conversion every pixel to output an analog signal 502. As seen from FIG. 1, the light receiving area 501 has a configuration such that BGR, that is, three prime color pixels are regularly arrayed. In the area 501, Gb denotes a G pixel positioned between B pixels, and Gr denotes a G pixel positioned between R pixels. In FIG. 1, 503 denotes an analog-to-digital converter (ADC) for converting the analog signal 502 to an a-bit width digital signal 504. The digital signal 504 is input to the pixel defect correction/noise prevention circuit 500.

The pixel defect correction/noise prevention circuit 500 has a 4H line memory 505, a first non-linear processor (pre-γ corrector) 511, a first shift register 515 and a rearrangement circuit 525. Further, the circuit 500 has a pixel defect judgment circuit 535, a selector 537, a subtracter 539, an amplitude limit circuit 541, a first multiplier 542, a first adder 544 and a second non-linear processor (reverse-γ corrector) 546.

The digital signal 504 is input to the 4H line memory 505, and then, the 4H line memory 505 outputs synchronized five line (0H to 4H) signals 506 to 510. The first non-linear processor (pre-γ corrector) 511 is supplied with three line (0H, 2h, 4H) signals 506, 508 and 510 of five line signals output from the 4H line memory 505. The first non-linear processor (pre-γ corrector) 511 performs pre-γ corrections with respect to the foregoing supplied signals to output b-bit width non-linear signals 512 to 514.

The first shift register 515 is supplied with signals 512 to 514 to output nine pixel same-color signals 516 to 524. The rearrangement circuit 525 is supplied with the same-color signals 516 to 524. Then, the rearrangement circuit 525 rearranges the foregoing signals to output non-linear signals 526 to 534.

The pixel defect judgment circuit 535 is supplied with rearranged non-linear signals 526 to 534. Then, the pixel defect judgment circuit 535 outputs a pixel defect judgment result signal 536, and a substitution signal for white or black defect. Specifically, the pixel defect judgment circuit 535 judges whether the center pixel of same-color 3×3=9 pixels is normal or white or black defect. Thereafter, the pixel defect judgment circuit 535 outputs the foregoing judgment result signal and a substitution signal replaced if the center pixel is white or black defect.

The selector 537 is supplied with the center pixel signal 520 of the same-color signals 516 to 524 and two substitution signals output from the pixel defect judgment circuit 535. The selector 537 selects one from the center pixel signal and two substitution signals based on a judgment signal 536. Then, the selector 537 outputs a non-linear signal 538 after pixel defect correction. Specifically, the selector 537 selectively outputs three signals based on three-way judgment results by the pixel defect judgment circuit 535. For example, if the center pixel is normal, the selector 537 intactly outputs the center pixel signal 520. If the center pixel has defect, the center pixel signal 520 is replaced with one pixel signal of peripheral eight pixels, and thereby, corrected. In this case, if the defect is white defect, the center pixel signal 520 is replaced with a substitution signal for white defect. If the defect is black defect, the center pixel signal 520 is replaced with a substitution signal for black defect.

The subtracter 539 is supplied with the center signal 530 of rearrangement result non-linear signals 526 to 534 and a non-linear signal 538 after pixel defect correction. The subtracter 539 executes subtraction of subtracting the non-linear video signal 538 from the signal 530 to extract a negative noise component 540 included in the non-linear video signal 538. The amplitude limit circuit 541 executes an amplitude limit processing of the noise component 540.

The first multiplier 542 multiplies an output of the amplitude limit circuit 541 by a prevention coefficient 543. The adder 544 adds an output of the first multiplier 542 to the pixel defect corrected non-linear signal 538, and thereby, outputs a noise-prevented digital video signal 545.

The second non-linear processor (reverse-γ corrector) 546 executes reverse-γ correction with respect to the noise-prevented digital video signal 545, and thereby, outputs a noise-prevented a-bit width linear signal 547.

The apparent-resolution restoration circuit (second signal processing block) 550 has a second shift register 551, a spatial band-pass filter (BPF) 552, a second multiplier 554, a 4-input selector 557 and a second adder 558.

The second shift register 551 is supplied with synchronized five line signals 506 to 510. The spatial BPF 552 is supplied with a desired digital signal group fetched from the second shift register 551. The spatial BPF 552 extracts a high-frequency component 553. The second multiplier 554 multiplies an output of the spatial BPF 552 by a restoration coefficient 555 to output an apparent-resolution restoration signal 556. The apparent-resolution restoration signal 556 is supplied to the second adder 558 together with the linear signal 547 output from the pixel defect correction/noise prevention circuit 500. The second adder 558 adds the foregoing two signals, and thereafter, output an added signal.

The 4-input selector 557 selects any one of four restoration coefficients (B coefficient, Gb coefficient, Gr coefficient, R coefficient) based on a vertical index signal LI and a horizontal index signal CS. Then, the selector 557 output the selected coefficient as a restoration coefficient 555.

In FIG. 1, the line memory 505 is located in the pixel defect correction/noise prevention circuit (first signal processing block) 500 while the second adder 558 is located in the apparent-resolution restoration circuit (second signal processing block) 550. In this case, the line memory 505 and the second adder 558 may be located in either of the pixel defect correction/noise prevention circuit 500 and the apparent-resolution restoration circuit 550.

Figure 2A:
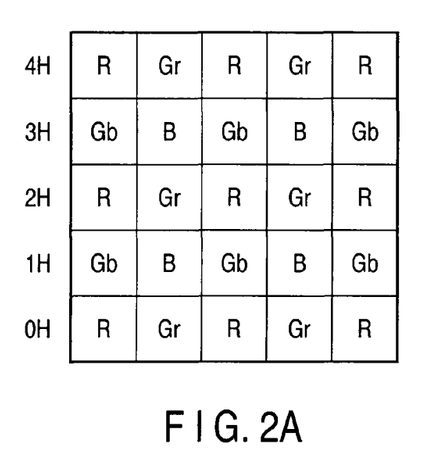
FIG. 2A is a view showing a color filter array of a partial area of a light receiving area of the CMOS image sensor shown in FIG. 1.
Figure 2B:
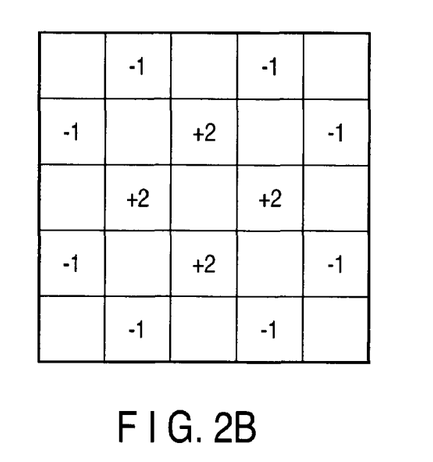
FIG. 2B is a view showing fixed coefficients of spatial BPF for obtaining a high-frequency component to be included in the center pixel R of a same-color filter array.

FIG. 2A shows a four-color pixel lattice (prime-color Bayer) array given as one example of a color filter array related to a partial area of the light receiving area 501 of FIG. 1. According to this embodiment, the light receiving area 501 has a general configuration. Namely, 2×2=4 color pixels (R, Gb, Gr, B) are given as one basic unit, and a plurality of basic units are repeatedly arrayed like a lattice. FIG. 2B shows spatial coefficients (fixed coefficients) of the spatial BPF 552 for obtaining a high-frequency component (apparent-resolution information) 553 to be included in the center pixel R of the area shown in FIG. 2A.

The operation of the CMOS image sensor shown in FIG. 1 will be described below. The m×n pixel light receiving area 501 photo-electrically converts an optical image to generate an analog signal 502 every pixel. The generated analog signal 502 is converted to an a-bit width (usually, a=10 to 12) linear video signal 504 by the ADC 503.

The pixel defect correction/noise prevention circuit 500 executes various corrections with respect to the foregoing digital signal 504 to perform pixel defect correction/noise prevention. First, the digital signal 504 is input to the 4H line memory 505 to obtain five pixel signals required for restoring a color signal. In this way, five line linear video signals 506 to 510 synchronizing 5H signals are obtained.

Of these five line digital signals 506 to 510, same-color line (0H, 2H, 4H) linear video signals 506, 508 and 510 are individually processed. Namely, the first non-linear processor 511 executes a non-linear processing calling pre-γ correction with respect to the signals. In this way, the signals 506, 508 and 510 are converted to b-bit width (b>a) non-linear digital signals (non-linear video signals) 512 to 514, respectively. These digital signals 512 to 514 each have features that black is decompressed while white is compressed. The foregoing non-linear processing is executed to previously and strongly perform pixel defect correction and noise prevention with respect to the black signal considering γ correction made in after-stage signal processing.

Figure 9A:
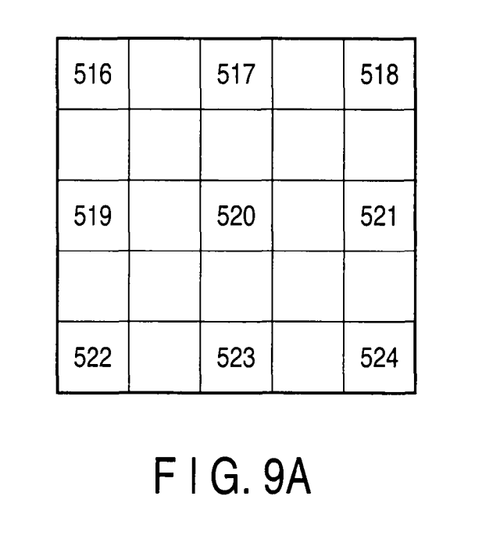
FIG. 9A is a view showing a spatial array of same-color signals in the light receiving area of the CMOS image sensor shown in FIG. 1.

The non-linear video signals 512 to 514 pass through the first shift register 515, and thereby, 3×3=9 same-color pixel non-linear video signals 516 to 524 are extracted. The signal 520 of the non-linear video signals 516 to 524 corresponds to the center pixel (R in this embodiment). A spatial arrangement of the non-linear video signals 516 to 524 of FIG. 1 is shown in FIG. 9A.

Figure 9B:
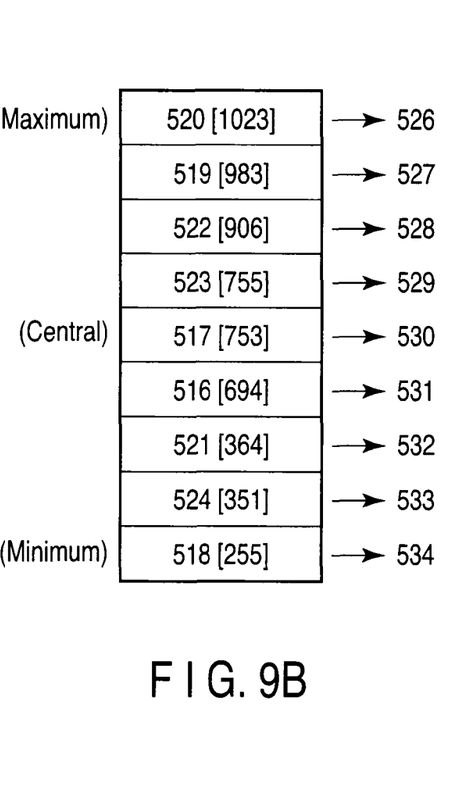
FIG. 9B shows the same-color signal rearrangement result in magnitude.

As shown in FIG. 9B, these non-linear video signals 516 to 524 are rearranged by the rearrangement circuit 525 in the order of signal magnitude, and thus, non-linear video signals 526 to 534 are generated. In FIG. 9B, a numerical value shown in [ ] of each signal shows a signal value.

The center signal 530 of non-linear video signals 526 to 534 rearranged in the order of signal magnitude is called as a median filter output. The center signal 530 is a narrow-band digital signal, which does not include a peculiar point (high-frequency random noise) at all. The non-linear video signals 526 to 534 are supplied to the pixel defect judgment circuit 535, and thereafter, the judgment result 536 is supplied to the selector 537. In this way, a defect signal only existing in the center is replaced with another signal, and thus, pixel defect correction (replacement of digital signal) is made.

Figure 9C:
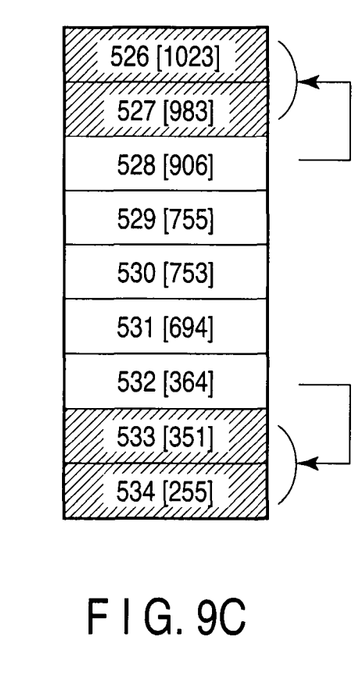
FIG. 9C is a view showing pixel defect judgment and a digital signal replacement method.

FIG. 9C shows a pixel defect judgment by the pixel defect judgment circuit 535 of FIG. 1 and a digital signal replacement method. For example, two pixels of same-color nine pixels are permitted to have defect. In this case, if the white defect is the first (maximum), the rearranged signal 528 is replaced as a substitution signal for the white defect to correct pixel defect. If the white defect is the second (the second from the maximum), the rearranged signal 528 is replaced as a substitution signal for the white defect to correct pixel defect. If black defect is the first (minimum), the rearranged signal 532 is replaced as a substitution signal for the black defect to correct pixel defect. If black defect is the second (the second from the minimum), the rearranged signal 532 is replaced as a substitution signal for the black defect to correct pixel defect.

The foregoing algorithm is based on the following understanding. Specifically, if at least optional three pixels including the center pixel of 3×3=9 same-color pixels have a peculiar level, it does not result from pixel defect, but results from a subject. According to this algorithm, it is possible to realize pixel defect correction having almost no error correction. The signal is replaced by the selector 537, and thereby, pixel defect is corrected, and thus, the non-linear video signal 538 including no pixel defect is output.

The non-linear video signal 538 and the rearranged center value, that is, median filter output signal 530 are input to the subtracter 539. Then, the non-linear video signal 538 is subtracted from the median filter output signal 530. In this way, the negative noise component 540 (=530−538) contained in the non-linear video signal 538 is extracted.

The foregoing noise component 540 includes resolution (edge) information; therefore, the amplitude is limited by the amplitude limiter 541. The amplitude-limited negative noise component 540 is further multiplied by the prevention coefficient 543 using the first multiplier 542. Thereafter, the digital signal 538 is added to the noise component 540 by the first adder 544. In this case, the amplitude-limited negative noise component 540 is always "0" when the prevention coefficient 543 is "0"; therefore, noise prevention is not carried out. The value of the prevention coefficient 543 is properly settable. Namely, the prevention coefficient is set high if noise prevention is made strong. Conversely, the prevention coefficient is set low if noise prevention is made weak. The amplitude-limited negative noise component is added to the non-linear video signal 538, and thereby, the noise component of the non-linear video signal 538 is offset. Therefore, the non-linear video signal 545 having desired noise prevention is obtained.

The non-linear video signal 545 is subjected to the foregoing pre-γ correction. For this reason, reverse-γ correction is carried out by the second non-linear processor 546 to perform reverse conversion, and thereby, the non-linear video signal 545 is come into an a-bit width linear video signal (digital signal) 547. The linear video signal 547 has almost no pixel defect and noise compared with the a-bit width digital signal 504 input to the line memory 505.

The foregoing operation of pixel defect correction and noise prevention needs an arithmetic processing of consequently making narrow the band of the digital video signal. For this reason, a reduction of resolution is not avoided. In order to solve the foregoing problem, according to this embodiment, the following operation is carried out to restore apparent resolution.

The foregoing synchronized five line linear video signals 506 to 510 pass through the second shift register 551 to come into 5×5=25 pixel digital signals. In order to extract a high-frequency component (apparent-resolution information) to be included in the center pixel from the digital signal group, necessary pixel digital signals are fetched from the second shift register 551. For example, the digital signal group passes through the spatial BPF 552 using the spatial coefficient shown in FIG. 2B, and thereby, a high-frequency component 553 is obtained. The high-frequency component 553 is multiplied by a restoration coefficient 555 by the second multiplier 554, and thereby, an apparent-resolution restoration signal 556 restoring apparent resolution is obtained.

Usually, R and B pixels have a sensitivity lower than G pixel (Gr, Gb), and also, have low S/N (quantization accuracy). The G pixel has many samples (pixels) compared with R and B pixels. Therefore, there is no need to strongly carry out apparent-resolution restoration depending on the after-stage processing method. For example, if common apparent-resolution restoration is carried out with respect to all color pixels to reduce the S/N ratio of Gr and Gb pixels, a problem arises.

In order to solve the foregoing problem, the 4-input selector 557 is used. The 4-input selector 557 selects the restoration coefficient 555 from four restoration coefficient (B coefficient, Gb coefficient, Gr coefficient, R coefficient) inputs based on a vertical index signal LI and a horizontal index signal CS. In this way, a value different every color pixel is set as the restoration coefficient 555. Thus, the BPF 552 using the spatial coefficient shown in FIG. 2B is used, and thereby, center R and B pixels are restored using Gr and Gb pixels other than pixels used for defect correction. In addition, center Gr and Gb pixels are restored using peripheral R and B pixels.

The pixel defect correction processing and noise prevention processing by the first signal processing block and the apparent-resolution restoration processing by the second signal processing block are successively carried out with respect to all pixels of the light receiving area.

The solid-state imaging device of this embodiment corrects a narrow band due to pixel defect correction and noise prevention. In addition, the apparent-resolution restoration circuit 550 corrects out-focus by an optical system including a lens, image blur resulting from signal leak between analog pixels and a narrow band by crosstalk correction to restore (improve) resolution. In this way, it is possible to realize a CMOS image sensor having an ideal resolution in accordance with the number of pixels.

Even if an already-existing CMOS image sensor is additionally provided with the apparent-resolution restoration circuit 550, the already-existing line memory 505 (e.g., relatively large size SRAM) is intactly usable. This serves to prevent an increase of the circuit scale. As described above, in order to obtain a plurality of same-color digital signals and different-color digital signals, the line memory 505 is used in common to the pixel defect correction/noise prevention circuit 500 and the apparent-resolution restoration circuit 550. Therefore, the circuit scale is reduced. Moreover, apparent-resolution restoration on RAM data is possible, and therefore, it is possible to realize a high-resolution CMOS image sensor, which is a small size and light, at low cost.

The spatial BPF 552 extracting a high-frequency component existing in the center from several different-color digital signals extracts a high-frequency component from a linear signal before non-linear processing. This serves to restore high-accuracy apparent resolution (high performance restoration processing is possible).

The spatial BPF having fixed coefficients is used as spatial BPF 552 extracting a high-frequency component existing in the center from several different-color digital signals. This serves to simplify the circuit configuration, and therefore, the circuit scale is reduced.

In the apparent-resolution restoration circuit 550 restoring apparent resolution, the second multiplier 554 is located after the spatial BPF 552. The second multiplier 554 multiplies a high-frequency component extracted by the spatial BPF 552 by optional coefficient (restoration coefficient). In this way, the restoration coefficient is changed, and thereby, apparent-resolution restoration effect is optionally variable.

Further, the 4-input selector 557 is located, and a value different every color pixel is obtained as a multiplication coefficient of the second multiplier 554, that is, the restoration coefficient. In this way, apparent-resolution restoration effect is optionally variable every color pixel, and it is possible to achieve higher S/N.

First Modification Example of First Embodiment

In the CMOS image sensor, if analog gain (hereinafter, referred to as AG) is set larger, there are many cases where a signal S/N is worsened. In such a case, apparent-resolution restoration processing is carried out, and thereby, the S/N is further worsened. In order to solve the foregoing problem, preferably, the restoration coefficient 555 is associated with color pixel and AG. Therefore, the restoration coefficient input to the second multiplier 554 may be changed in cooperated with AG, an average luminance level in a screen and luminance difference in an area.

Figure 3:
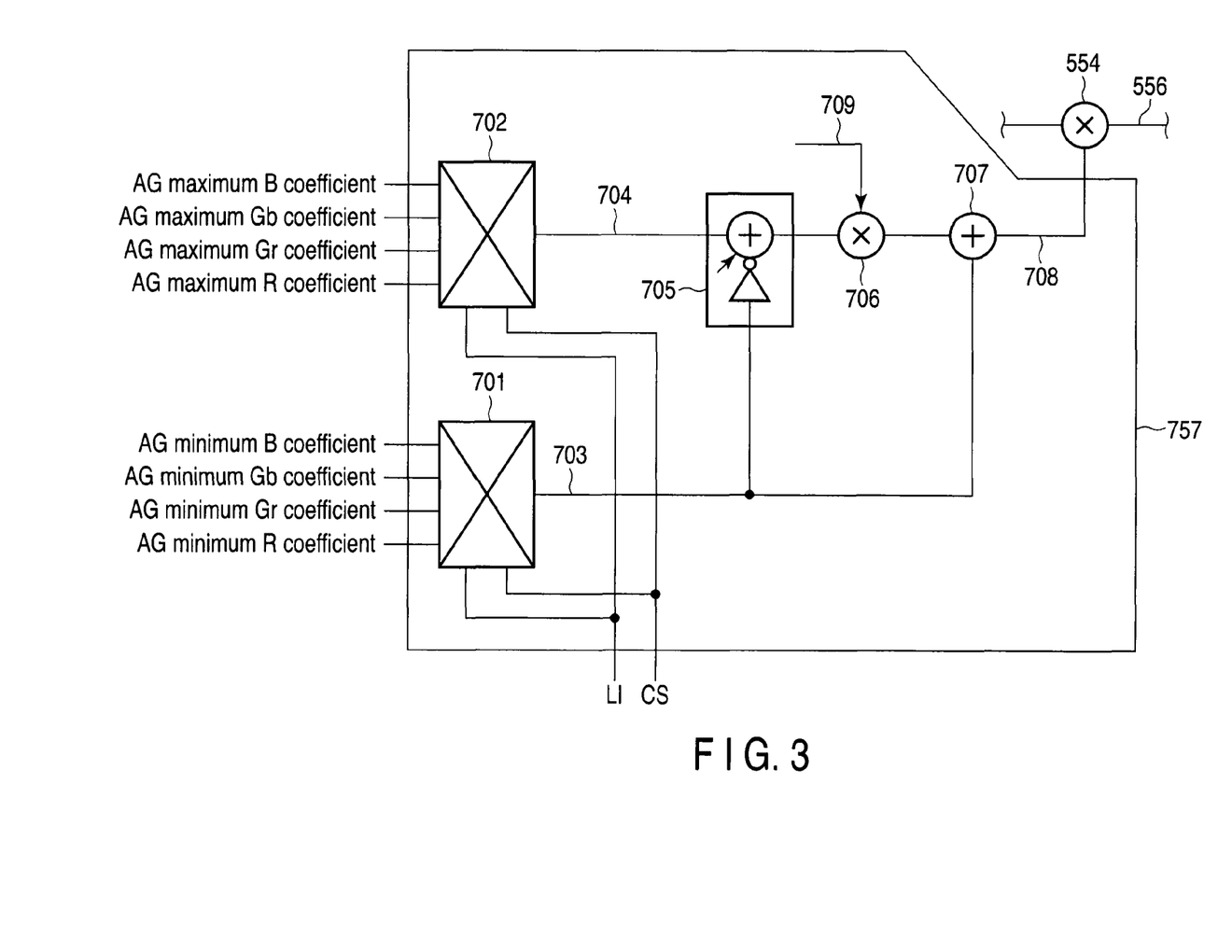
FIG. 3 is a circuit diagram showing a configuration of a modification example of a four-input selector included in the CMOS image sensor of FIG. 1.

FIG. 3 is a block diagram showing the configuration of a 4-input selector 757 according to a modification example of the 4-input selector 557 shown in FIG. 1. The 4-input selector 757 has a circuit configuration for realizing the following case. Specifically, a restoration coefficient used for multiplication executed after extracted high-frequency component (apparent-resolution information) to be included in the center pixel is cooperated with pixel color and AG. In FIG. 3, 701 denotes a 4-input selector, which is supplied with four restoration coefficients when AG is the minimum. 703 denotes the selected AG minimum restoration coefficient. 702 denotes a 4-input selector, which is supplied with four restoration coefficients when AG is the maximum. 704 denotes the selected AG maximum restoration coefficient. 705 denotes a subtracter, which subtracts the AG minimum restoration coefficient 703 from the selected AG maximum restoration coefficient 704. 706 denotes a multiplier, which multiplies an output signal of the subtracter 705 by AG information 709. 707 denotes an adder, which adds the AG minimum restoration coefficient 703 to an output signal of the multiplier 706. An output signal from the adder 707 comes into a restoration coefficient 708 cooperated with pixel color and AG.

The circuit operation of FIG. 3 will be described below. The 4-input selector 701 selects a restoration coefficient for each pixel color when AG is the minimum to output the restoration coefficient 703. The 4-input selector 702 selects a restoration coefficient for each pixel color when AG is the maximum to output the restoration coefficient 704. The restoration coefficients 703 and 704 are input to the subtracter 705, and then, the output of the subtracter 705 and the AG information 709 are input to the multiplier 706. Further, the output from the multiplier 706 and the restoration coefficient 703 are added to the adder 707. In this way, the restoration coefficient 709 cooperated with AG is obtained. For example, a digital signal is used as the AG information 709. The digital signal has a range from "0" when AG is the minimum to "255" when AG is the maximum. The restoration coefficient 708 cooperated with Ag thus obtained is input to the second multiplier 554 in place of the restoration coefficient 55 shown in FIG. 1. An apparent-resolution restoration signal 556 thus obtained is added to the digital signal 547 by the second adder 558 shown in FIG. 1.

According to this modification example, in the apparent-resolution restoration circuit 550 restoring apparent resolution, when the second multiplier 554 multiplies the extracted high-frequency component by restoration coefficient, a value corresponding to AG is used as restoration coefficient. In this way, apparent-resolution restoration effect is variable in accordance with analog gain, and it is possible to prevent S/N in low luminance from being worsened.

A value corresponding to an average luminance level in a screen may be used as the restoration coefficient input to the second multiplier 554. In this way, an apparent-resolution restoration effect is optionally variable in accordance with the brightness of the screen.

Moreover, a value corresponding to a luminance level in a desired area of the light receiving area 501 or the maximum luminance difference between several desired areas may be used as the restoration coefficient input to the second multiplier 554. In this way, apparent-resolution restoration effect is optionally variable in accordance with luminance distribution in a screen or luminance difference between areas.

Second Modification Example of First Embodiment

FIG. 1 relates to the case where the relationship between the bit width a (10 to 12 bits) and the bit width b is a<b. However, the relationship may be set to a≧b. In such a case, the processing order of the 4H line memory 505 and the first non-linear processor (pre-γ corrector) 511 is replaced, and thereby, the circuit scale is made small.

Second Embodiment

Figure 4:
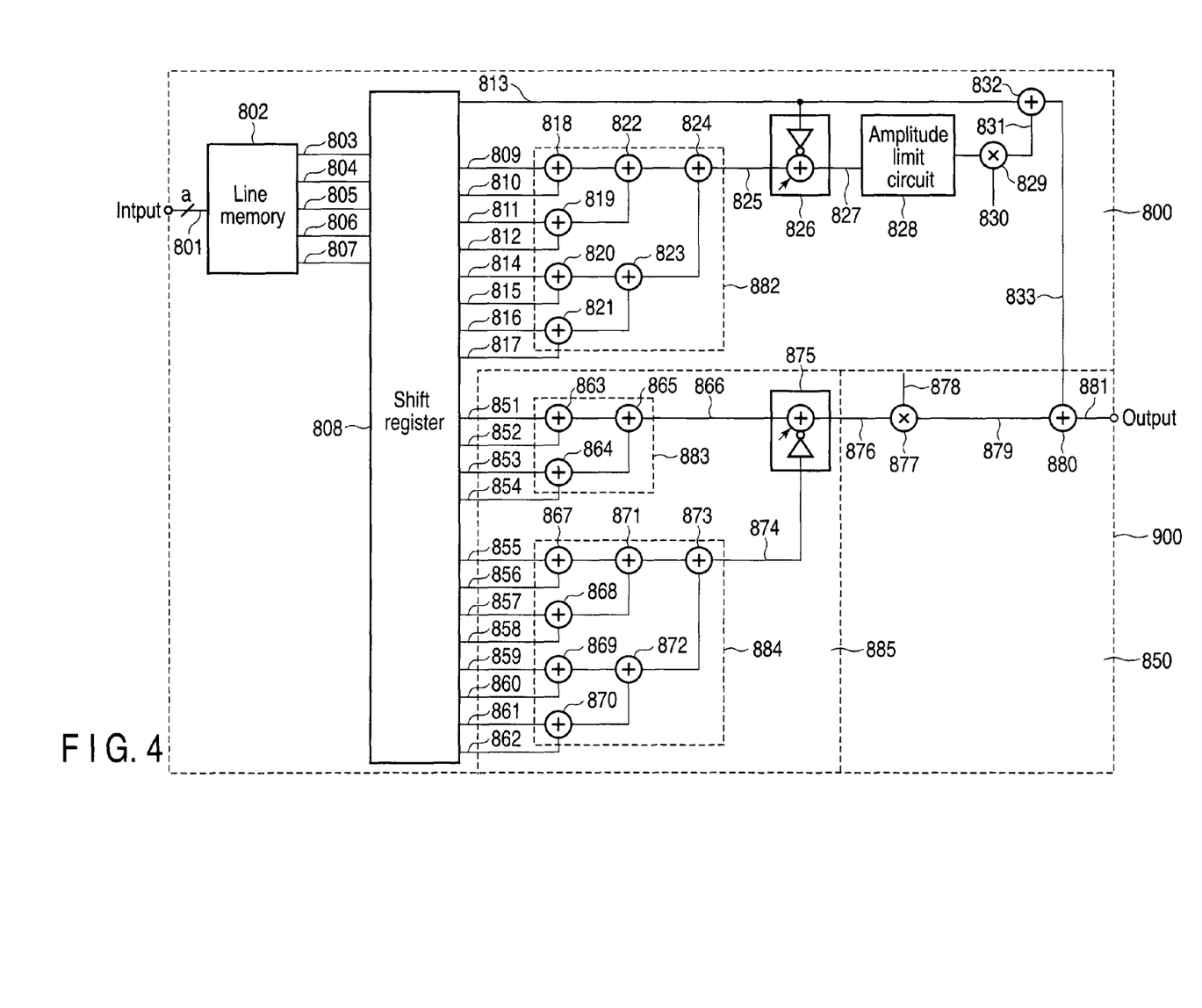
FIG. 4 is a block diagram showing the configuration of a part of a CMOS image sensor according to a second embodiment of the present invention.

FIG. 4 is a block diagram showing the configuration of a part of a CMOS image sensor according to a second embodiment of a solid-state imaging device of the present invention. The CMOS image sensor has a digital signal processing circuit 900. The digital signal processing circuit 900 is configured to combine a noise prevention circuit (first signal processing block) 800 with an apparent-resolution restoration circuit (second signal processing block) 850.

The noise prevention circuit (first signal processing block) 800 has a 4H line memory 802 supplied with an output of an ADC 503, a shift register 808, and a first average circuit 882. Further, the circuit 800 has a first subtracter 826, an amplitude limit circuit 828, a first multiplier 829 and a first adder 831.

The 4H line memory 802 is supplied with an a-bit width digital video signal 801. The 4H line memory 802 outputs synchronized five line (0H to 4H) linear digital video signals 803 to 807. The shift register 808 is supplied with the foregoing signals 803 to 807. The shift register 808 outputs same-color 9 pixel signals 809 to 817 and different-color 12 pixel signals 851 to 862.

Seven adders 818 to 824 form the foregoing first average circuit 882. The first average circuit 882 adds peripheral 8 pixel signals 809 to 817 excluding a pixel positioning on the center in same-color 9 pixels included in a desired area output from the shift register 808. Lower 3 bits of the added signal are eliminated so that the signal is set to a ⅛ value, and thereby, an average signal 825 of 8 pixels is obtained. The first subtracter 826 subtracts the center pixel signal 813 from the average signal 825 so that a negative noise component 827 included in the center pixel signal 813 is extracted.

The negative noise component 827 is amplitude-limited by the amplitude limit circuit 828. The first multiplier 829 multiplies an output of the amplitude limit circuit 828 by a prevention coefficient 830. Multiplication of the prevention coefficient 830 by the first multiplier 829 is executed, and thereafter, the first adder 832 adds the original digital signal 813 to the multiplied signal. In this way, a noise component included in the digital signal 813 is offset; therefore, it is possible to obtain a linear video signal 833, which is subjected to desired noise prevention.

The apparent-resolution restoration circuit (second signal processing block) 850 has a spatial BPF 885, a second multiplier 877 and a second adder 880. The spatial BPF 885 includes second, third average circuits 883, 884 and a second subtracter 875.

Three adders 863 to 865 form the foregoing second average circuit 883. The second average circuit 883 adds different-color 4 pixel signals 851 to 854 on the center included in a desired area output from the shift register 808. Lower 2 bits of the added signal are eliminated so that the signal is set to a ¼ value, and thereby, an average signal 866 of four pixels is obtained. Likewise, seven adders 867 to 873 form the foregoing third average circuit 884. The third average circuit 884 adds peripheral different-color 8 pixel signals 855 to 862 included in a desired area output from the shift register 808. Lower 3 bits of the added signal are eliminated so that the signal is set to a ⅛ value, and thereby, an average signal 874 of eight pixels is obtained. The second subtracter 875 subtracts the average signal 874 of peripheral different-color 8 pixels from the average signal 866 of the center different-color 4 pixels. In this way, a high-frequency component 876 existing in the center pixel digital signal is extracted.

The second multiplier 877 multiplies an output signal 876 of the second subtracter 875 by a restoration coefficient 878 to generate an apparent-resolution restoration signal 879. For example, the restoration coefficient 555 output from the 4-input selector 557 shown in FIG. 1 or the restoration coefficient 708 output from the 4-input selector 757 shown in FIG. 3 is used as the restoration coefficient 878. The second adder 880 adds the apparent-resolution restoration signal 879 to the noise-prevented digital video signal 833 to generate an apparent-resolution restored digital video signal 881.

In FIG. 4, both line memory 802 and shift register 808 are located in the noise prevention circuit (first signal processing block) 800. In this case, the foregoing line memory 802 and shift register 808 may be located in either of the noise prevention circuit 800 and the apparent-resolution restoration circuit 850.

The operation of the CMOS image sensor shown in FIG. 4 will be described below. An a-bit width digital video signal 801 is output from the ADC 503. The digital video signal 801 may be linear or non-linear video signal. The digital signal 801 is input to the 4H line memory 802, and then, synchronized five line digital video signals 803 to 807 are output. The digital signals 803 to 807 include same-color 3 line (0H, 2H, 4H) signals 803, 805 and 807. These digital signals 803 to 807 pass through the shift register 808, and thereby, 3×3=9 same-color pixel digital video signals 809 to 817 are extracted (digital signal 813 corresponds to the center pixel).

In order to obtain the average signal 825 of peripheral same-color 8 pixels excluding the center pixel, digital signals 809 to 812 and 814 to 817 are input to the first average circuit 882, and then, added and averaged. In this way, the final-stage adder 824 outputs the average signal 825. This average signal 825 is a video signal having almost no random noise component. Therefore, the subtracter 826 subtracts the center pixel digital signal 813 from the average signal 825, and thereby, a negative noise component 827 (=825−813) included in the digital signal 813 is extracted. The noise component includes resolution information. Amplitude limit by the amplitude limit circuit 828 and coefficient multiplication by the first multiplier 829 are carried out with respect to the noise component 827, and thereby, a negative noise component 831 is extracted. Then, the first adder 832 adds the noise component 831 to the original digital signal 813, and thereby, noise component is offset, and thus, a noise-prevented digital video signal 833 is obtained.

The foregoing noise prevention operation needs an arithmetic processing of consequently making narrow a band of the digital video signal. For this reason, it is difficult to avoid a reduction of resolution. In order to solve the foregoing problem, according to this embodiment, the following operation is carried out to restore apparent resolution.

The shift register 808 outputs same-color pixel digital video signals 809 to 817 to prevent noise of the center pixel, and simultaneously, outputs different-color digital video signals 851 to 862 to restore apparent resolution.

Figure 5A:
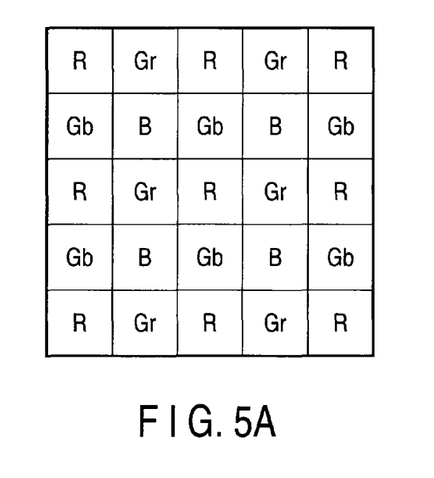
FIG. 5A is a view showing a color filter array of a partial area of a light receiving area of the CMOS image sensor shown in FIG. 4.
Figure 5B:
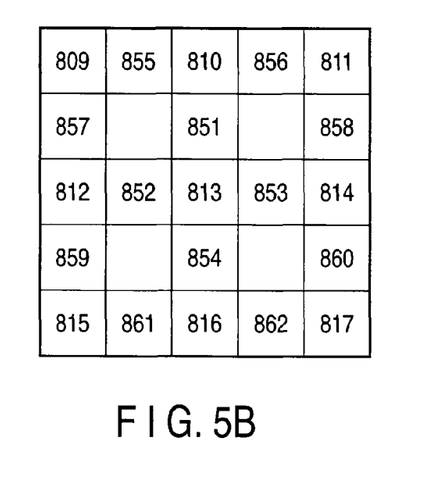
FIG. 5B is a view showing a spatial arrangement of same-color nine pixel signals and different-color 12 pixel signals in the light receiving area.

FIG. 5A shows a color filter array of a part of the light receiving area in the CMOS image sensor according to this embodiment. This embodiment relates to the case where the light receiving area has the following configuration. Specifically, 2×2=4 color pixels (R, Gb, Gr, B) are given as a basic unit, and a plurality of basic units are repeatedly arrayed like a lattice. FIG. 5B shows a spatial arrangement of same-color 9 pixel digital signals 809 to 817 and different-color 12 pixel digital signals 851 to 862.

Digital signals 851 to 854 are input to the second average circuit 883, and then, successively added to obtain an average signal 866 of the center different-color 4 pixels. Likewise, digital signals 855 to 862 are input to the third average circuit 884, and then, successively added to obtain an average signal 874 of peripheral different-color 8 pixels. The second subtracter 875 subtracts the added signal 875 from the average signal 866 (866-874), and thereby, a high-frequency component 876 is extracted. Then, the second multiplier 877 multiplies the high-frequency component 876 by the restoration coefficient 878, and thereby, an apparent-resolution restoration signal 879 is obtained. Thereafter, the second adder 880 adds the noise-prevented video signal 833 and the apparent-resolution restoration signal 879. In this way, the second adder 880 outputs a digital video signal 881, which is subjected to noise prevention and apparent-resolution restoration.

The noise prevention by the first signal processing block and the apparent-resolution restoration by the second signal processing block are successively carried out with respect to all pixels of the light receiving area.

The solid-state imaging device of this embodiment has the following features. Namely, noise prevention is performed with respect to each pixel of the light receiving area while apparent resolution is restored.

Moreover, the shift register 808 obtaining a plurality of same-color and different color digital signals is used in common to the first and second signal processing blocks. This serves to reduce the circuit scale compared with the first embodiment.

Third Embodiment

Figure 6:
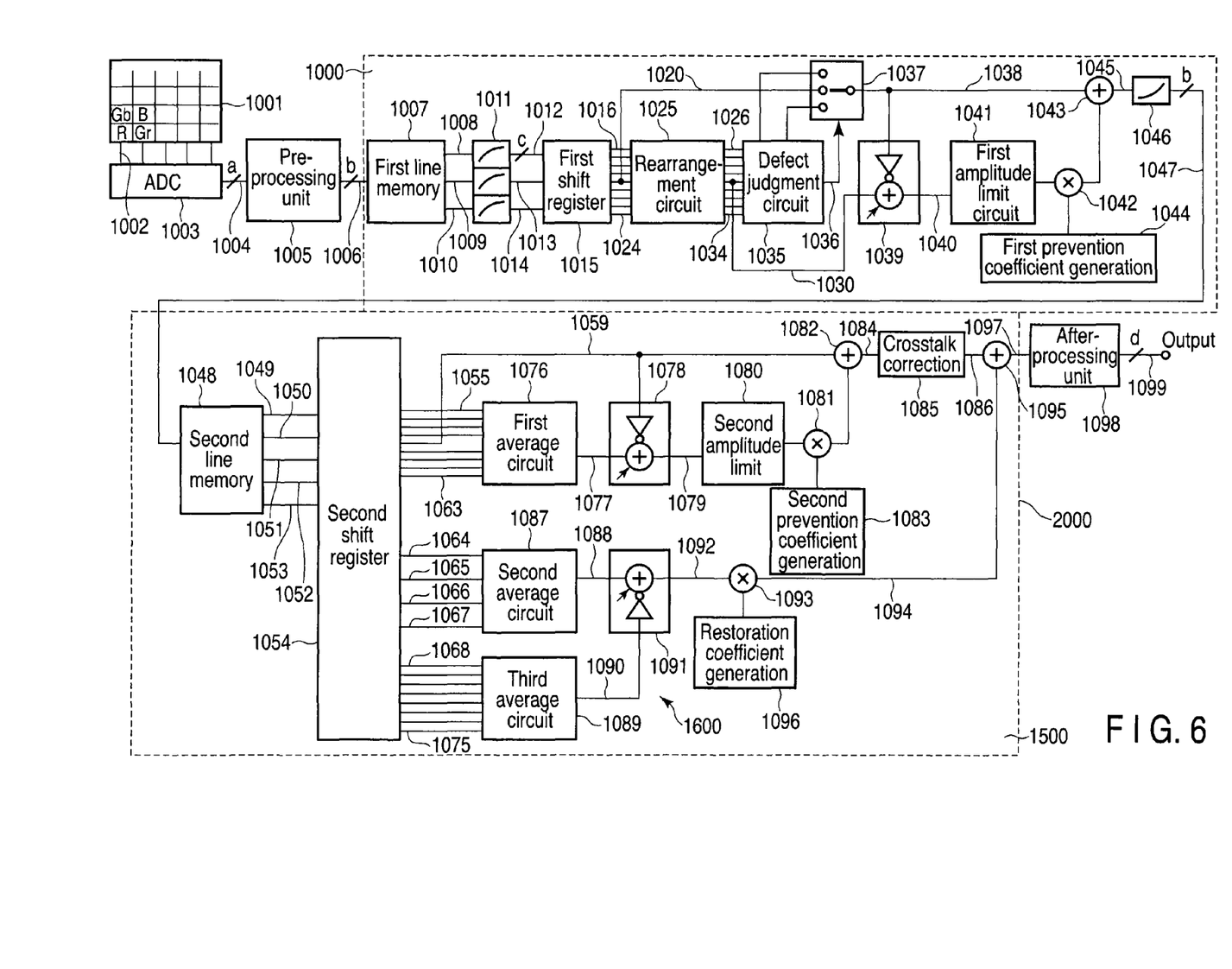
FIG. 6 is a block diagram showing the configuration of a part of a CMOS image sensor according to a third embodiment of the present invention.

FIG. 6 is a block diagram showing the configuration of a part of a CMOS image sensor according to a third embodiment of a solid-state imaging device of the present invention. The CMOS image sensor has a digital signal processing circuit 2000. The digital signal processing circuit 2000 is configured to combine a pixel defect correction/noise prevention circuit (first signal processing block) 1000 with a noise prevention/apparent-resolution restoration circuit (second signal processing block) 1500. The circuit 1000 performs pixel defect correction and noise prevention in a non-linear area (after pre-γ correction). The circuit 1500 performs noise prevention and apparent-resolution restoration in a linear area (after reverse-γ correction).

In FIG. 6, 1001 denotes a light receiving area having a plurality of m×n pixels (m and n are optionally integer numbers) performing photoelectric conversion. The light receiving area 1001 performs photoelectric conversion for each pixel to output an analog signal 1002. As seen from FIG. 6, the light receiving area has the configuration such that BGR three primary color pixels are regularly arrayed. Gb is a G pixel positioned between B pixels and Gr is a G pixel positioned between R pixels. In FIG. 6, 1003 denotes an analog-to-digital converter (ADC) for converting the analog signal 1002 to an a-bit width digital signal 1004. The digital signal 1004 is converted to a b-bit width digital signal 1006 by a pre-processing unit 1005, and then, input to the pixel defect correction/noise prevention circuit (first signal processing block) 1000.

The pixel defect correction/noise prevention circuit 1000 has a first 4H line memory 1007, a first non-linear processor (pre-γ corrector) 1011, a first shift register 1015, a rearrangement circuit 1025 and a pixel defect judgment circuit 1035. The circuit 1000 further has a selector 1037, a first subtracter 1039, a first amplitude limit circuit 1041, a first multiplier 1042, a first adder 1043, a first prevention coefficient generation circuit 1044 and a second non-linear processor (reverse-γ corrector) 1046.

The first 4H line memory 1007 is supplied with the digital signal 1006. Then, the first 4H line memory 1007 outputs synchronized 3 line (0H, 2H, 4H) signals 1008 to 1010. These 3 line signals 1008 to 1010 are input to the first non-linear processor (pre-γ corrector) 1011. The first non-linear processor (pre-γ corrector) 1011 executes a pre-γ correction with respect to these input signals to output c-bit width non-linear signals 1012 to 1014.

The first shift register 1015 is supplied with signals 1012 to 1014. Then, the first shift register 1015 outputs 9 pixel same-color signals 1016 to 1024. The rearrangement circuit 1025 is supplied with same-color signals 1016 to 1024. Then, the rearrangement circuit 1025 rearranges these signals to output non-linear signals 1026 to 1034.

The pixel defect judgment circuit 1035 is supplied with replaced result, that is, non-linear signals 1026 to 1034. The pixel defect judgment circuit 1035 outputs a pixel defect judgment result signal 1036 and substitution signals for white and black defects. Specifically, the pixel defect judgment circuit 1035 judges whether or not the center pixel of same-color 3×3=9 pixels is normal or white or black defect. Then, the pixel defect judgment circuit 1035 outputs the judgment result signal and two substitution signals substituted when the center pixel is white or black defect.

The selector 1037 is supplied with the center pixel signal 1020 of same-color signals 1016 to 1024 and two substitution signals output from the pixel defect judgment circuit 1035. The selector 1037 selects one signal from the center pixel signal 1020 and two substitution signals based on the judgment signal 1036. Then, the selector 1037 outputs a pixel defect corrected non-linear signal 1038. Specifically, the selector 1037 selectively outputs three-way signals based on three-way judgment results by the pixel defect judgment circuit 1035. For example, if the center pixel is normal, the center pixel signal 1020 is intactly output. If the center pixel has defect, the center pixel signal 1020 is replaced with one pixel signal of peripheral 8 pixels, and thereby, correction is made. In this case, if the defect is white defect, the center pixel signal 1020 is replaced with the substitution signal for a white defect. If the defect is black defect, the center pixel signal 1020 is replaced with the substitution signal for a black defect.

The subtracter 1039 is supplied with the center signal 1030 of replaced result non-linear signals 1026 to 1034 and a pixel defect corrected non-linear signal 1038. The subtracter 1039 subtracts the non-linear video signal 1038 from the signal 1030 to extract a negative noise component 1040 included in the non-linear video signal 1038. The first amplitude limit circuit 1041 executes amplitude limit processing with respect to the negative noise component 1040.

The first multiplier 1042 multiplies an output of the first amplitude limit circuit 1041 by a first prevention coefficient generated by the first prevention coefficient generation circuit 1044. The first adder 1043 adds an output of the first multiplier 1042 to the pixel defect corrected non-linear signal 1038, and thereby, outputs a noise-prevented digital video signal 1045.

The second non-linear processor (reverse-γ corrector) 1046 executes a reverse-γ correction with respect to the noise-prevented digital video signal 1045, and thereby, outputs a noise-prevented b-bit width linear signal 1047.

The pixel defect corrected and noise-prevented linear signal 1047 output from the pixel defect correction/noise prevention circuit 1000 is input to the noise prevention/apparent-resolution restoration circuit 1500.

The apparent-resolution restoration circuit 1500 has a second 4H line memory 1048, a second shift register 1054, a first average circuit 1076, a second subtracter 1078 and a second amplitude limit circuit 1080. Further, the circuit 1500 has a second multiplier 1081, a second adder 1082, a second prevention coefficient generation circuit 1083 and a crosstalk correction circuit 1085. Furthermore, the circuit 1500 has a second average circuit 1087, a third average circuit 1089, a third subtracter 1091, a third multiplier 1093, a restoration coefficient generation circuit 1096 and a third adder 1095.

The foregoing linear signal 1047 output from the pixel defect correction/noise prevention circuit 1000 is input to the second 4H line memory 1048. The second 4H line memory 1048 outputs synchronized 5 line (0H to 4H) signals 1049 to 1053. These signals 1049 to 1053 are input to the second shift register 1054. The second shift register 1054 outputs same-color 9 pixel signals 1055 to 1063, different-color 4 pixel signals 1064 to 1067 existing on the center and different-color 8 pixel signals 1068 to 1075 existing at periphery.

Of same-color 9 pixel signals 1055 to 1063 outputted from the second shift register 1054, peripheral same-color 8 pixel signals 1055 to 1058 and 1060 to 1063 excluding the center pixel are input to the first average circuit 1076. For example, the first average circuit 1076 is composed of seven adders like the first average circuit 882 shown in FIG. 4. The first average circuit 1076 adds signals 1055 to 1058 and 1060 to 1063 output from the second shift register 1054. The lower 3 bits of the added signal are eliminated, and thereby, the signal is set to a ⅛ value so that an average signal 1077 of 8 pixels is output. The second subtracter 1078 subtracts the center pixel signal 1059 from the average signal 1077 to extract a negative noise component 1079 included in the center pixel signal 1059.

The negative noise component 1079 is amplitude-limited by the second amplitude limit circuit 1080. The second multiplier 1081 multiplies an output of the second amplitude limit circuit 1080 by a second prevention coefficient generated by the second prevention coefficient generation circuit 1083. Multiplication of the second prevention coefficient by the second multiplier 1081 is performed, and thereafter, the second adder 1082 adds the amplitude-limited component and the digital signal 1059. In this way, the noise component included in the digital signal 1059 is offset; therefore, a desired noise-prevented linear video signal 1084 is obtained. This linear video signal 1084 comes into a crosstalk-corrected linear video signal 1086 by the crosstalk correction circuit 1085.

4 pixel signals 1064 to 1067 outputted from the second shift register 1054 are input to the second average circuit 1087. For example, this second average circuit 1087 is composed of three adders like the second average circuit 883 shown in FIG. 4. The second average circuit 1087 adds signals 1064 to 1067 output from the second shift register 1054, and lower 2 bits of the added signal are eliminated, and thereby, the signal is set to a ¼ value, and thus, an average signal 1088 of 4 pixels is output.

8 pixel signals 1068 to 1075 outputted from the second shift register 1054 are input to the third average circuit 1089. For example, this third average circuit 1089 is composed of seven adders like the second average circuit 884 shown in FIG. 4. The third average circuit 1089 adds signals 1068 to 1075 output from the second shift register 1054, and lower 3 bits of the added signal are eliminated, and thereby, the signal is set to a ⅛ value, and thus, an average signal 1090 of 8 pixels is output. The third subtracter 1091 subtracts the average signal 1090 from the average signal 1088 to extract a high-frequency component 1092 existing in the center pixel signal 1059. The third multiplier 1093 multiplies an output of the third subtracter 1091 by a restoration coefficient to generate an apparent-resolution restoration signal 1094. The foregoing second average circuit 1087, third average circuit 1089 and third subtracter 1091 form a spatial BPF 1600 having a fixed spatial coefficient.

In this case, for example, the 4-input selector 557 shown in FIG. 1 or the 4-input selector 757 shown in FIG. 3 is usable as the restoration coefficient generation circuit 1096 for generating a restoration coefficient.

The third adder 1095 adds a crosstalk-corrected linear video signal 1086 and an apparent-resolution restoration signal 1094 to output an apparent-resolution restored linear video signal 1097. This signal 1097 is converted to a d-bit digital video signal 1099 by the after-processing unit 1098.

Figure 7:
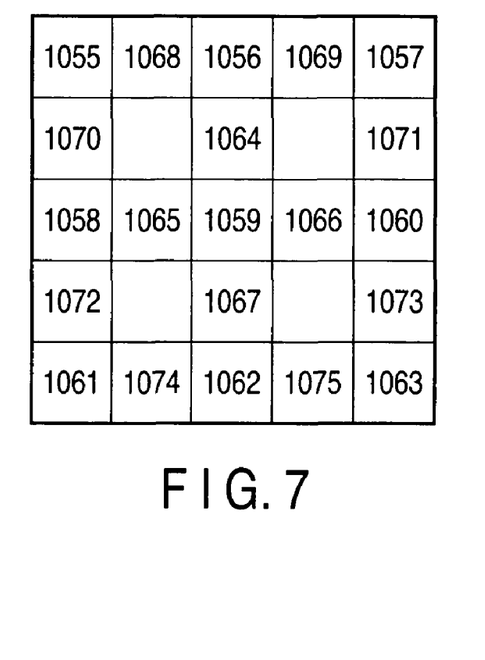
FIG. 7 is a view showing a spatial array of nine pixel same-color signals and 12 pixel different-color signals obtained from a 5×5=25 pixel area in a light receiving area of the CMOS image sensor of FIG. 6.

FIG. 7 shows a spatial arrangement of the light receiving area 1001 shown in FIG. 6. Specifically, FIG. 7 shows a spatial arrangement of 9 pixel same-color signals 1055 to 1063 obtained from a desired area comprising 5×5=25 pixels and 12 pixel different-color signals 1064 to 1075.

The operation of the CMOS image sensor shown in FIG. 6 will be described below. The light receiving area 1001 having m×n pixels photo-electrically converts an optical image to generate an analog signal 1002 for each pixel. The generated analog signal 1002 is converted to an a-bit width (usually, a=10 to 12) linear video signal 1004 by the ADC 1003. The pre-processing unit 1005 includes an operation circuit for performing white balance control and shading correction, and outputs the processed result as a b-bit width linear video signal 1006.

The linear video signal 1006 is input to the first 4H line memory 1007, and then, output as synchronized same-color 3 line linear video signals 1008 to 1010. These signals 1008 to 1010 are subjected to pre-γ correction by the first non-linear processor 1011 to be individually converted to c-bit width non-linear video signals 1012 to 1014. These signals 1012 to 1014 are converted to 3×3=9 same-color pixel non-linear video signals (digital signals) 1016 to 1024 by the first shift register 1015. Of the signals 1016 to 1024, the signal 1020 corresponds to the center pixel.

The foregoing signals 1016 to 1024 are rearranged in the order of magnitude by the rearrangement circuit 1025. Then, the rearranged results 1026 to 1034 are input to the pixel defect judgment circuit 1035. A judgment signal 1036 of the pixel defect judgment circuit 1035 is input to the selector 1037 to perform pixel defect correction (replacement of digital signal). A pixel defect corrected non-linear video signal 1038 and the rearranged center signal 1030 are input to the subtracter 1039 to extract a negative noise component 1040 (=1030−1038). The noise component 1040 is subjected to amplitude limit by the first amplitude limiter 1041 and coefficient multiplication by the first multiplier 1042. Thereafter, the first adder 1043 adds the obtained result and the pixel defect corrected signal 1038 to offset the noise component.

The first prevention coefficient generation circuit 1044 generates a first prevention coefficient in order to vary noise prevention effect in a non-linear area. For example, if a low S/N video is only obtained when AG is the maximum, the first prevention coefficient is made large, and thereby, the prevention effect is made high to improve the S/N. If a high S/N video is obtained when AG is the minimum, the first prevention coefficient is made small, and thereby, the prevention effect is reduced to improve resolution. A noise-prevented non-linear video signal 1045 is subjected to reverse-γ correction by the second non-linear processor 1046 to be again converted to a b-bit width linear video signal 1047.

The foregoing operation of performing pixel defect correction and noise prevention needs an arithmetic operation of consequently making narrow a band of the digital signal. Therefore, it is difficult to avoid a reduction of resolution. In order to solve the foregoing problem, according to this embodiment, the following operation is carried out in order to restore apparent resolution.

The signal 1047 is input to the second 4H line memory 1048. Then, the second 4H line memory 1048 outputs synchronized 5 line linear video signals 1049 to 1053. These signals 1049 to 1053 are input to the second shift register 1054, and then, output as 5×5=25 pixel area linear video signals.

The center pixel and same-color peripheral 8 pixel signals 1055 to 1058 and 1060 to 1063 are input to the first average circuit 1076. Then, the first average signal 1076 outputs an average signal 1077. The center pixel signal 1059 and the average signal 1077 are input to the subtracter 1078 to extract a negative noise component 1079. The noise component 1079 is subjected to amplitude limit by the second amplitude limit circuit 1080 and coefficient multiplication by the second multiplier 1081. Thereafter, the second adder 1082 adds the obtained result and the center pixel signal 1059 so that the noise component is offset. The second prevention coefficient generation circuit 1083 generates a second prevention coefficient. The second prevention coefficient is used for varying noise prevention effect in a linear area. A noise-prevented linear video signal 1084 is subjected to crosstalk correction by the crosstalk correction circuit 1085 for amplifying a color carrier component. As a result, a high S/N linear video signal 1086 is generated although it has a narrow band. The crosstalk correction circuit 1085 is located for the purpose of improving color reproduction. However, the signal band is reduced depending on the circuit configuration, and resolution is reduced. The center existing different-color 4 pixel signals 1064 to 1067 are input to the second average circuit 1087. Then, the second average circuit 1087 outputs an average signal 1088 adding 4 pixel signals and averaging them.

Peripheral existing different-color 8 pixel signals 1068 to 1075 are input to the third average circuit 1089. Then, the third average circuit 1089 outputs an average signal 1090 adding 8 pixel signals and averaging them.

The foregoing average signals 1088 and 1090 are input to the subtracter 1091 to extract a high-frequency component 1092 (=1088-1090) for restoring apparent resolution. The high-frequency component 1092 is subject to coefficient multiplication by the third multiplier 1093. Then, the third multiplier 1093 outputs an apparent-resolution restoration signal 1094. The third adder 1095 adds the noise-prevented signal 1086 and the apparent-resolution restoration signal 1094 so that apparent resolution is restored. The restoration coefficient generation circuit 1096 generates a restoration coefficient. This restoration coefficient varies apparent-resolution restoration effect.

An apparent-resolution restored linear video signal 1097 is input to the after-processing unit 1098. The after-processing unit 1098 includes operation circuits such as electron zoom (pixel thinning), color separation (RGB synchronization), γ correction, YUV matrix and parallel/serial conversion. The processed result is output as a b-bit width digital video signal 1099.

Pixel defect correction and noise prevention by the first signal processing block and noise prevention and apparent-resolution restoration by the second signal processing block are successively carried out with respect to all pixels of the light receiving area.

In the solid-state imaging device of this third embodiment, the foregoing pixel defect correction and noise prevention are carried out by the first signal processing block, and thereby, the resolution of the output signal 1047 is reduced. However, apparent resolution is restored by the second signal processing block.

Application Example

Figure 8:
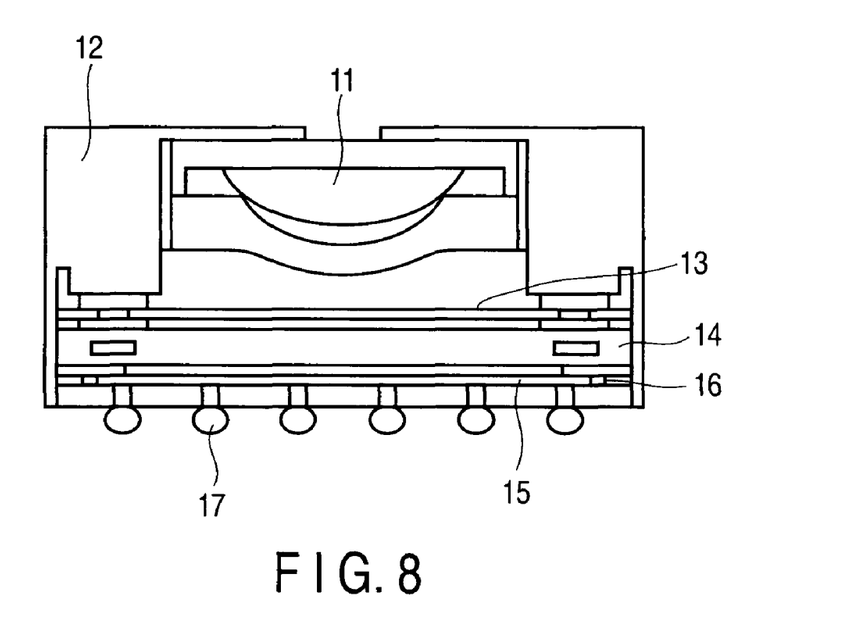
FIG. 8 is a cross-sectional view showing a camera module using a CMOS image sensor according to various embodiments of the present invention.

FIG. 8 is a cross-sectional view showing the structure of a small-size reflow-able camera module used for mobile phones according to one application example of a solid-state imaging device of the present invention. This camera module is a chip scale camera module (CSCM) using a CMOS area image sensor, and has a structure such that a lens and a lens holder are directly attached to a sensor chip. In FIG. 8, 11 denotes an optical lens, 12 denotes a lens holder, and 13 denotes an IR cut filter. 14 denotes a glass plate, 15 denotes a CMOS image sensor chip (semiconductor chip), 16 denotes an electrode penetrating through the chip and 17 denotes a solder ball for connecting the camera module onto a mother board (not shown).

According to the foregoing structure of the camera module, the size of the optical lens is made small to perform small-sized and light structure. However, the foregoing small-sized and light structure is performed using the solid-state imaging device of the present invention including a digital signal processing circuit for restoring apparent resolution. Therefore, it is possible to realize a low-cost and high-resolution camera module.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state imaging device comprising:
a light receiving area configured to include a plurality of different-color pixels each performing photoelectric conversion;
an analog-to-digital conversion circuit configured to convert a photo-electrically converted analog signal in each pixel of the light receiving area to a digital signal; and a digital signal processing circuit configured to receive the digital signal output from the analog-to-digital conversion circuit, and configured to perform a digital processing with respect to the received digital signal, and configured to output a digital-processed signal, the digital signal processing circuit including:
a first signal processing block configured to perform a first processing for preventing a noise component included in a digital signal of a pixel positioning on the center of several pixels included in a desired area of the light receiving area; and
a second signal processing block configured to perform a second processing for extracting a high-frequency component existing in a digital signal of a pixel positioning on the center of several pixels included in a desired area of the light receiving area to restore apparent resolution;
wherein the digital signal processing circuit further including:
a line memory included in either of the first and second signal processing blocks, the line memory configured to output a plurality of horizontal line signals in the light receiving area;
wherein the second signal processing block including:
a shift register configured to receive an output of the line memory, and configured to output a plurality of pixel digital signals positioning at a periphery of the pixel positioning on the center restoring the apparent resolution and having color different from the pixel positioning on the center; and
a spatial band-pass filter configured to receive an output of the shift register, and configured to include a fixed spatial coefficient for extracting a high-frequency component existing in a digital signal of the pixel positioning on the center.

2. The device according to claim 1, wherein the first signal processing block configured to perform a third processing for detecting and correcting a signal defect of the pixel positioning on the center, in addition to the first processing.

3. The device according to claim 1, wherein the second signal processing block further including:
a multiplication circuit configured to multiply a high-frequency component extracted by the spatial band-pass filter by an optional coefficient.

4. The device according to claim 3, wherein the second signal processing block further including:
a coefficient select circuit configured to select one coefficient from a plurality of prepared coefficients according to a color of a pixel positioning the center, and configured to supply the selected coefficient to the multiplication circuit.

5. The device according to claim 1, wherein the light receiving area has a plurality of pixels having a primary-color Bayer array.

6. The device according to claim 1, wherein the digital signal processing circuit further including:
an adder circuit included in either of the first and second signal processing blocks, the adder circuit configured to add an output of the first signal processing block and an output of the second signal processing block.

7. The device according to claim 1, wherein the digital signal processing circuit further including:
a shift register included in the first signal processing block, the shift register configured to receive an output of the line memory, and configured to output a plurality of same-color pixel digital signals including a pixel positioning on the center and a plurality of pixel digital signals positioning at a periphery of the pixel positioning on the center restoring the apparent resolution and having color different from the pixel positioning on the center.

8. The device according to claim 7, wherein the second signal processing block including:
a spatial band-pass filter configured to receive a plurality of pixel digital signals having color different from the pixel positioning on the center output from the shift register, and configured to include a fixed spatial coefficient for extracting a high-frequency component existing in a digital signal of the pixel positioning on the center.

9. The device according to claim 7, wherein the second signal processing block further including:
a multiplication circuit configured to multiply a high-frequency component extracted by the spatial band-pass filter by an optional coefficient.

10. The device according to claim 9, wherein the second signal processing block further including:
a coefficient select circuit configured to select one coefficient from a plurality of prepared coefficients according to a color of a pixel positioning the center, and configured to supply the selected coefficient to the multiplication circuit.

11. A solid-state imaging device comprising:
a light receiving area configured to include a plurality of different-color pixels each performing photoelectric conversion;
an analog-to-digital conversion circuit configured to convert a photo-electrically converted analog signal in each pixel of the light receiving area to a digital signal; and
a digital signal processing circuit configured to receive the digital signal output from the analog-to-digital conversion circuit, and configured to perform a digital processing with respect to the received digital signal, and configured to output a digital-processed signal, the digital signal processing circuit including:
a first signal processing block configured to perform a first processing for detecting and correcting a signal defect of a pixel positioning on the center of several pixels included in a desired area of the light receiving area, and configured to perform a second processing for preventing a noise component of a digital signal of the pixel positioning on the center; and
a second signal processing block configured to perform a third processing for receiving an output from the first signal processing block, and configured to extract a high-frequency component existing in a digital signal of a pixel positioning on the center of a plurality of pixels included in the desired area of the light receiving area;
wherein the first signal processing block including:
a first line memory configured to output a plurality of horizontal line signals in the light receiving area; and the second signal processing block including:
a second line memory configured to output a plurality of horizontal line signals having the number different from the first line memory in the light receiving area;
wherein the second signal processing block further including:

a shift register configured to receive an output of the second line memory, and configured to output a plurality of same-color pixel digital signals including the pixel positioning on the center and a plurality of pixel digital signals positioning at a periphery of the pixel positioning on the center restoring the apparent resolution and having color different from the pixel positioning on the center; and a spatial band-pass filter configured to receive a plurality of different-color pixel digital signals output from the shift register, and configured to include a fixed spatial coefficient for extracting a high-frequency component existing in a digital signal of the pixel positioning on the center.

12. The device according to claim 11, wherein the first signal processing block outputs a linear signal to the second signal processing block.

13. The device according to claim 12, wherein the second signal processing block configured to perform a fourth processing for preventing a noise component included in a pixel digital signal positioning on the center, in addition to the third processing.

14. The device according to claim 11, wherein the second signal processing block further including:
a multiplication circuit configured to multiply a high-frequency component extracted by the spatial band-pass filter by an optional coefficient.

15. The device according to claim 14, wherein the second signal processing block further including:
a coefficient select circuit configured to select one coefficient from a plurality of prepared coefficients according to a color of a pixel positioning the center, and configured to supply the selected coefficient to the multiplication circuit.

16. The device according to claim 11, wherein the light receiving area has a plurality of pixels having a primary-color Bayer array.

* * * * *